United States Patent [19]
Hall

[11] Patent Number: 5,936,029
[45] Date of Patent: Aug. 10, 1999

[54] MACROCYCLIC POLYMERS HAVING LOW HYSTERESIS COMPOUNDED PROPERTIES

[75] Inventor: James E. Hall, Mogadore, Ohio

[73] Assignee: Bridgestone Corporation, Tokyo, Japan

[21] Appl. No.: 08/939,287

[22] Filed: Sep. 29, 1997

Related U.S. Application Data

[62] Division of application No. 08/743,779, Nov. 10, 1996, Pat. No. 5,700,888.

[51] Int. Cl.$^6$ .............................. C08K 3/36; C08K 3/04; C08F 36/04
[52] U.S. Cl. ..................... 524/572; 524/571; 524/576; 524/586; 525/106; 525/194; 525/195; 525/196; 525/331.9; 525/332.3; 525/332.8; 525/332.9; 525/359.5; 525/359.6; 525/370; 525/371; 525/374; 525/375; 525/379; 525/382; 525/383; 526/175; 526/176; 526/183; 526/190; 152/450
[58] Field of Search .................................. 526/183, 190, 526/335, 340, 175, 176; 524/572, 571, 576, 586; 525/106, 194, 195, 196, 331.9, 332.3, 332.8, 332.9, 359.5, 359.6, 370, 371, 374, 375, 379, 382, 383

[56] References Cited

U.S. PATENT DOCUMENTS

| | | |
|---|---|---|
| 3,351,646 | 11/1967 | Ramsden et al. . |
| 3,354,190 | 11/1967 | Ramsden . |
| 3,388,179 | 6/1968 | Ramsden . |
| 3,726,933 | 4/1973 | Smith et al. ..................... 526/183 X |
| 3,766,091 | 10/1973 | Vandenberg ..................... 528/413 X |
| 3,822,219 | 7/1974 | Kamienski . |
| 4,116,887 | 9/1978 | Lehn et al. ........................ 528/37 X |
| 4,139,490 | 2/1979 | Halasa et al. . |
| 4,401,800 | 8/1983 | Hall . |
| 4,410,742 | 10/1983 | Mueller . |
| 4,429,091 | 1/1984 | Hall . |
| 4,520,123 | 5/1985 | Hall . |
| 4,672,097 | 6/1987 | Hall . |
| 5,066,729 | 11/1991 | Stayer, Jr. et al. . |
| 5,268,413 | 12/1993 | Antkowiak . |
| 5,268,439 | 12/1993 | Hergenrother et al. . |
| 5,272,207 | 12/1993 | Hall et al. . |
| 5,521,309 | 5/1996 | Antkowiak et al. . |
| 5,523,371 | 6/1996 | Lawson et al. ................. 526/180 X |

FOREIGN PATENT DOCUMENTS

| | | |
|---|---|---|
| 0 316 255 | 5/1989 | European Pat. Off. . |
| 0 692 492 | 1/1996 | European Pat. Off. . |
| 3817888 | 12/1988 | Germany . |

OTHER PUBLICATIONS

Hsieh, H.S. and I.W. Wang. Effects of Dibutylmagnesium on Alkyllithium–Initiated Polymerizations. Macromolecules 1986, 19: 299–304.

Rempp, P., E. Franta, and J.E. Herz. Macromolecular Engineering by Anionic Methods. Advances in Polymer Science 86: 148–149, 159–160. Springer–Verlag, Berlin, Heidelberg, 1988.

Van Beylen, M., et al. Developments in Anionic Polymerization—A Critical Review. Advances in Polymer Science 86: 117–119, 141–142. Springer–Verlag, Berlin, Heidelberg, 1988.

Fujita, K., et al. Magnesium–Butadiene Addition Compounds: Isolation, Structural Analysis and Chemical Reactivity. J. Organometallic Chemistry, 113(1976): 201–213.

Hild, G., C. Strazielle and P. Rempp. Cyclic Macromolecules. Synthesis and Characterization of Ring–Shaped Polystyrenes. Eur. Polym. J. 19 (8): 721–727, 1983.

Hild, G., A. Kohler and P. Rempp. Synthesis of Ring–Shaped Macromolecules. Eur. Polym. J. 16: 525–527, 1980.

Schober, B.J., et al. New Delocalized Tetraanion Initiators For Polymeric Catenane Synthesis. Polymer Preprints 30(2): 199–200.

Geiser, D. and H. Höcker. Synthesis and Investigation of Macrocyclic Polystyrene. Macromolecules 1980, 13: 653–656.

Yasuda, H. et al. Magnesium–Assisted Stereospecific Oligomerization of Isoprene. Unique Chemical Behaviors of Magnesium–Isoprene Adducts, $[Mg(C_5H_8)_m]_n$. Macromolecules 11(3): 586–592, 1978.

Roovers, J. and P.M. Toporowski. Synthesis of High Molecular Weight Ring Polystyrenes. Macromolecules 1983, 16: 843–849.

Gruter, G–J. M., et al. Formation of the First Organometallic Catenane. J. Am. Chem. Soc. 1993, 115: 12179–12180.

Bickelhaupt, F. Organomagnesium Chemistry: Nearly Hundred Years But Still Fascinating. J. Organometallic Chem 475 (1994): 1–14.

Noboru, et al. "An Attempt at the Preparation of Macrocyclic Polymer". J. Macromol. Sci. –Chem., vol. A9(4): 551–561, 1995.

Quirk et al, "Anionic Syntheses of Functionalized Cyclic Macromolecules Using a Living Coupling Agent", Polym. Prepr. (ACS Div. Polym. Chem.) (1988) 29(2), 10–11, Sep. 1988.

*Primary Examiner*—Fred Teskin
*Attorney, Agent, or Firm*—Daniel N. Hall

[57] ABSTRACT

The present invention provides a method of anionic synthesis of stable macrocyclic polymers that are compounded to form vulcanizable elastomeric compounds exhibiting reduced hysteresis properties. Cyclic organometallic compounds containing divalent metal atoms of Groups IIA and IIB of the Periodic System are employed as initiators of anionic polymerization of conjugated diene, vinyl aromatic and/or triene monomers. Coupling of the living ends of the resulting macrocyclic polymers or copolymers with a coupling agent or a coupling agent that is also a functionalizing agent results in stable macrocyclic polymers with improved hysteresis properties.

25 Claims, 4 Drawing Sheets

MACROCYCLIC POLYMERS HAVING LOW HYSTERESIS COMPOUNDED PROPERTIES

This is a divisional of application(s) Ser. No. 08/743,779 filed Nov. 10, 1996, now U.S. Pat. No. 5,700,888.

BACKGROUND OF THE INVENTION

The subject invention relates to a practical process of anionic synthesis of stable macrocyclic diene and vinyl aromatic polymers and copolymers using cyclic organometallic polymerization initiators containing metals of Group IIA and IIB of the Periodic System. More particularly, the invention relates to the formation of coupled/functionalized macrocyclic polymers that may be compounded to produce vulcanizable elastomers exhibiting low hysteresis properties. Such elastomers, when used to form articles, such as tires, shock absorbers, mounts, power belts and the like, will show an increase in rebound, a decrease in rolling resistance and have less heat build-up when mechanical stresses are applied.

Previous attempts at preparing reduced hysteresis compounds have included high temperature mixing of the filler-rubber mixtures in the presence of selectively-reactive promoters to promote compounding material reinforcement, surface oxidation of the compounding materials, and chemical modifications to the terminal end of polymers using 4,4'-bis(dimethylamino)-benzophenone (Michler's ketone), tin coupling agents and the like, and surface grafting thereon. All of these approaches have focused upon increased interaction between the elastomer and the compounding materials.

It has also been recognized that carbon black, employed as a reinforcing filler in rubber compounds, should be well dispersed throughout the rubber in order to improve various physical properties. This dispersion can be achieved, for example, by endcapping polydienes by reacting a metal terminated polydiene with a capping agent, such as a halogenated nitrile, a heterocyclic aromatic nitrogen-containing compound or a trialkyl tin halide. Additionally, it is known in the art that both ends of the polydiene chains can be capped with polar groups by utilizing functionalized anionic initiators, such as lithium amides.

In another approach, lithium amino magnesiate anionic polymerization initiators, stable at high polymerization temperatures, have been employed to produce polymers containing a high level of tertiary amine functionality with functional end groups derived from the initiator. Such polymers can be compounded to produce vulcanizable elastomers exhibiting reduced hysteresis properties. This approach is disclosed in U.S. Pat. No. 5,610,227, the disclosure of which relative to functionalizing of polymers is hereby incorporated by reference.

A need still exists, however, for methods of preparing polymers and vulcanizable elastomers that exhibit reduced hysteresis properties.

SUMMARY OF THE INVENTION

A practical process for anionic synthesis of commercially significant quantities of stable macrocyclic polymers, from polar and non-polar monomers, using Group IIA and IIB metal cyclic organometallic initiators, is disclosed in U.S. Pat. No. 5,677,399, entitled "Synthesis of Macrocyclic Polymers With Group IIA and IIB Metal Cyclic Organometallic Initiators" and U.S. Pat. No. 5,665,827, entitled "Synthesis of Multiblock Polymers Using Cycloorganometallic Initiators", the disclosures of which are hereby incorporated by reference. These macrocyclic and multiblock polymers exhibit desirable properties, such as low viscosities at high molecular weights, and thus provide for enhanced polymer processability during molding, extruding and the forming of films.

The present invention is concerned with a method of reducing hysteresis by coupling the living ends of the macrocyclic polymers with a functionalizing agent, resulting in macrocyclic polymers that may be compounded to form vulcanizable elastomeric compounds and articles that exhibit reduced hysteresis properties. In the context of this invention, a functionalizing agent is one that interacts with the metal-bound polymer and simultaneously covalently closes the ring and provides a functional group capable of reacting with a filler.

According to the method of the invention, a vulcanizable elastomeric compound having reduced hysteresis properties is prepared by polymerizing an unsaturated anionically polymerizable monomer in a solvent, preferably an anhydrous, aprotic solvent, in the presence of an initiator comprising a Group IIA and IIB cyclic organometallic compound. The initiator comprises a low molecular weight ring-shaped adduct of a divalent metal with a reactant (Rct), or heterogeneous mixture of reactants, and contains one or more metal atoms (Mt) and one or more reactant units (Rct) in the ring structure, according to the formula

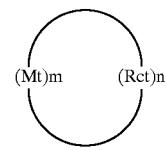

where m and n represent each independently represent at least one.

The cyclic organometallic initiators are described in U.S. Pat. No. 5,677,399. The reactant (Rct) may comprise any reactant that combines chemically with the metal atom to form a ring-shaped initiator, such reactants including, but not limited to, aliphatic olefins, styrene, substituted styrenes, cyclic or acyclic conjugated diolefins, including butadiene, isoprene, myrcene, α-phellandrene, and the like, or aromatic-hydrocarbons, such as anthracene and naphthalene. Certain dihalo organic compounds can react via Schlenk-type equilibria to produce cyclic organometallic initiators useful in the invention. The metal employed in the initiator is selected from the Group IIA and IIB metals consisting of beryllium, calcium, barium, strontium, magnesium, cadmium, zinc and mercury. Preferably, the metal is magnesium and the initiator comprises a cyclic organomagnesium compound.

The polymerization reaction is terminated with a coupling or coupling/functionalizing agent to close the ring and form a stable macrocyclic polymer. The polymer is then compounded with the addition of a filler, such as silica or carbon black, or mixtures of these, in a compounding formulation to form a vulcanizable elastomeric compound.

The anionically polymerizable monomers of the invention include, but are not limited to, unsaturated hydrocarbon monomers, such as butadiene, isoprene and the like, and copolymers thereof with monovinyl aromatics, such as styrene, alpha methyl styrene and the like, or trienes, such as myrcene. Preferably, the polymerization is carried out in the presence of a monomer randomizing agent and/or a vinyl modifier for increasing the vinyl content of the polymer.

In particular, the invention provides a method for preparing a vulcanizable elastomeric compound having reduced hysteresis properties, the vulcanizable elastomeric compound prepared according to the method, and a tire comprising at least one component formed from the vulcanizable elastomeric compound.

The invention also provides a method for preparing a functionalized polymer having improved hysteresis properties by polymerization of an unsaturated anionically polymerizable monomer, as above, and terminating the polymerization with a functionalizing agent. After quenching, the polymers still retain the functional group on the polymer ring. The use of a functionalizing agent also serves to endcap any linear polymers present in the polymer mixture with a functional group. Provision of functional groups on polymers are known to provide for improved interaction with fillers, such as silica and carbon black, to produce vulcanizable elastomers with reduced hysteresis properties.

The invention provides the functionalized polymer prepared according to the method of the invention, a vulcanizable elastomeric compound comprising the functionalized polymer, and a tire comprising at least one component formed from the vulcanizable elastomeric compound.

DETAILED DESCRIPTION OF THE INVENTION

Figure 1:
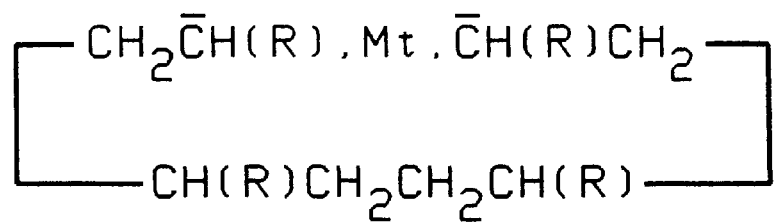
FIG. 1 is a representation of a typical Group IIA or IIB metal cyclic organometallic initiator employed for anionic polymerization in the process of the invention to produce macrocyclic polymers.

As described above, commercially significant quantities of macrocyclic polymers can be produced by anionic polymerization of polar or non-polar monomers by using cyclic organometallic initiators containing metals of Groups IIA and IIB of the Periodic System. The present invention provides a method of producing vulcanizable elastomers with reduced hysteresis properties and functionalized macrocyclic polymers with improved hysteresis properties employing these initiators.

It has been unexpectedly discovered herein that anionically polymerizing non-polar monomers in the presence of the cyclic organometallic initiators, and coupling the living ends of the resulting macrocyclic polymers with a coupling agent to close the ring, results in stable macrocyclic polymers that can be compounded to form vulcanizable elastomers with reduced hysteresis properties. It has been further unexpectedly discovered herein that, when the coupling agent is also a functionalizing agent, functional groups attached to the macrocyclic polymers and functional groups that endcap linear polymers in the polymer mixture have improved interaction with fillers, such as silica and carbon black, in the compounding process to form vulcanizable elastomeric compounds with reduced hysteresis properties. When compounded to make products such as tires, shock absorbers, mounts, power belts and the like, the polymeric products of this invention exhibit increased rebound, decreased rolling resistance and less heat build-up when mechanical stresses are applied, resulting in improved fuel economy.

The anionically polymerizable monomers of the present invention preferably comprise unsaturated hydrocarbon monomers, such as ethylene; conjugated alkadienes having from about 4 to about 40 carbon atoms, preferably $C_4$–$C_{12}$ alkadienes, including butadiene, isoprene, and the like; aryl alkenes having from about 8 to about 20 carbon atoms, such as styrene and $C_1$–$C_7$ alkyl or alkoxy substituted styrenes; vinyl polynuclear aromatics, such as vinyl anthracene and vinyl naphthalene and their $C_1$–$C_7$ alkyl and alkoxy substituted analogs; $C_6$–$C_{18}$ trienes; and mixtures of these. Preferably, the polymerization is carried out in the presence of a monomer randomizing agent and/or a vinyl modifier for increasing the vinyl content of the polymer. Macrocyclic polymers formed by anionic polymerization of the above described monomers include, but are not limited to, polyethylene, polybutadiene, polyisoprene, polystyrene, poly-α-methyl styrene, polyvinylanthracene, polyvinylnaphthalene, and mixtures and copolymers of these, such as styrene butadiene rubber (SBR).

The macrocyclic copolymers formed by the process of the invention may comprise from about 99 to 10 percent by weight of monomer A units and from about 1 to about 90 percent by weight of monomer B units. The copolymers may be random copolymers or block copolymers. Random copolymers result from simultaneous copolymerization of the monomers A and B with randomizing agents. Block copolymers, poly(b-B-b-A-b-B), result from the separate polymerization of the monomers forming the A and B polymers. The block copolymer, poly(b-styrene-b-butadiene-b-styrene) is referred to as an S-B-S triblock polymer. Such block copolymers are the subject of U.S. Pat. No. 5,665,827.

The Group IIA and IIB metal cyclic organometallic initiators employed in the invention are prepared according to known methods, under anhydrous, anaerobic conditions, by reacting "m" divalent metal, Mt, in the form of elemental metal or a reactive compound, such as a hydride, with "In" reactants, Rct, where m and n each independently represent at least one, according to the formula

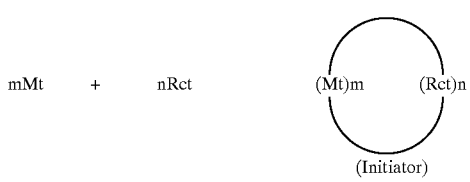

mMt + nRct → (Mt)m (Rct)n
(Initiator)

The metal can be in the form of elemental metal, either pure or alloyed with another, nonreactive metal, or in the form of a reactive compound, such as a metal hydride. Typically, pure metal is used. As is known with the formation of Grignard reagents, the metal may be activated by scraping, ultrasound or the addition of small amounts of activators, such as alkyl halides, metal alkyl halides or halogens, such as iodine.

The reactant, Rct, can be olefinic, such as alkene or alkadiene (e.g., a $C_2$–$C_{12}$ alkene or $C_4$–$C_{40}$ alkadiene), or alkylene, such as styrene or styrene analogs (e., a $C_8$–$C_{28}$ aralkene), polynuclear aromatic, or a dihaloorganic compound, such as an alpha, omega dihalo $C_4$–$C_8$ alkane or a di(halomethyl) substituted aromatic, such as 1,2-di (chloromethyl) benzene or 1,8-di(bromomethyl) naphthalene.

The initiator ring incorporates at least one metal atom and at least one Rct unit and generally contains at least 3, and usually a total of 5 to 50, ring member atoms. Typically, the larger number of ring atoms (e.g., greater than 12) result when there is more than one metal atom and more than one Rct unit in the ring (i.e., n and m>1). When n=m=1, the initiator ring usually has 5 to 8 ring atoms and typically 5 to 7 ring atoms.

The cyclic organometallic initiator thus synthesized is employed to initiate polymerization, under anhydrous, anaerobic conditions, of at least one unsaturated anionically polymerizable monomer, Mono, to form a macrocyclic polymer, as illustrated below, containing "x" monomers (Mono)x, where each x represents a degree of polymerization of one or more. Polymerization of a non-polar unsaturated monomer requires the presence of an activator, as discussed further below.

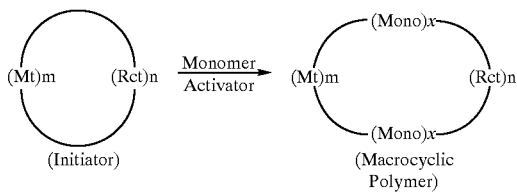

The macrocyclic polymers thus produced are highly unstable in air and moisture. By the process of the invention, macrocyclic polymers that are stable in air and moisture and which have low hysteresis properties can be obtained if polymerization is terminated by coupling agents (Cp) that covalently close the ring structure. It was unexpectedly discovered, however, that terminating the reaction with coupling agents that are also functionalizing agents (CpF), results in further reduction of hysteresis properties by providing functional groups (F) are attached to the ring, as schematically illustrated below. The reaction with a coupling/functionalizing agent may result in the metal atom remaining in the polymer ring. Alternatively, the metal atom may be removed from the ring by the reaction.

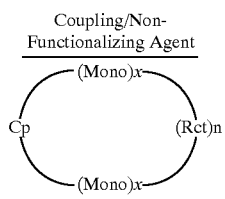

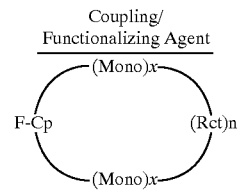

Although termination with a coupling agent results in a high level of polymer coupling, the reaction also produces linear polymers, resulting in a mixture of macrocyclic and linear polymers. A coupling/functionalizing agent adds a functional group to the polymer ring and also acts as an "endcapping" agent for the linear polymers by adding a functional group (F) to one or both ends (E) of the linear polymer.

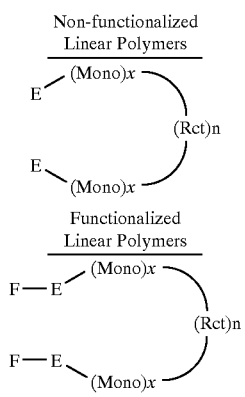

As described further below, in addition to coupling together the living ends of a single ring, the coupling/functionalizing agent may couple together the living ends of adjacent rings, forming macrocyclic polymer rings incorporating a plurality of single rings. In some cases, a coupling/functionalizing agent may couple together living ends of more than one ring, forming intermolecular coupled polymers. By similar processes, intertwining polymer chains or catenanes may be formed. A tetra-reactive coupling/functionalizing agent may produce a figure eight double ring. Thus, both intramolecular and intermolecular coupling are favored by the process of the invention. The macrocyclic polymers may thus be produced with high concentrations of monomers to result in quantities of macrocyclic polymers suitable for commercial applications, such as the production of vulcanizable elastomeric compounds and rubber articles, such as power belts, shock absorbers, mounts, and tires.

A typical cyclic organometallic initiator for use in the invention is illustrated in FIG. 1 and comprises a divalent metal atom Mt complexed to the carbons ($\overline{C}$) of one or more reactant units contained in a ring, wherein the metal atom is selected from the group consisting of beryllium, calcium, barium, strontium, magnesium, cadmium, zinc and mercury. While a variety of Group II metals, as disclosed above, can be used to form the cyclic initiators of this invention, magnesium is preferred because of its reactivity and availability. Therefore in the following, for convenience, magnesium will be discussed with the understanding that the other metals disclosed can also be used with it or in its place, without departing from the invention. The cyclic organometallic initiators utilized in the invention are prepared by known methods, typically employing Grignard reagents, in the presence of a polar, aprotic solvent under anhydrous, anaerobic conditions. For example, methods for preparing barium or strontium polystyrene rings in this manner are known.

In a preferred embodiment of the invention, the cyclic organometallic initiator comprises a cyclic organomagnesium compound. Cyclic low molecular weight adducts containing magnesium may be obtained by reacting activated magnesium metal or magnesium hydride, in the presence of a solvent, such as benzene or tetrahydrofuran (THF), with reactant such as those described above. Suitable reactant hydrocarbon compounds and reaction conditions for use in preparing the magnesium-containing adducts used in this invention are disclosed in U.S. Pat. Nos. 3,388,179, 3,354,190 and 3,351,646, the portions of which pertaining to such reactant hydrocarbon compounds and reaction conditions are hereby incorporated by reference. Other suitable synthesis methods may also be employed to prepare cyclic organomagnesium or other cyclic organometallic initiators. For example, certain dihalo organic compounds can function as the reactant, Rct, and will react with magnesium via the Schlenk equilibrium to produce magnesium dihalide and a cyclic organomagnesium product suitable for use as an initiator of the invention. Among these are the $C_4$–$C_8$ alpha, omega alkanes and di(halomethyl) substituted aromatics described above.

Figure 2:
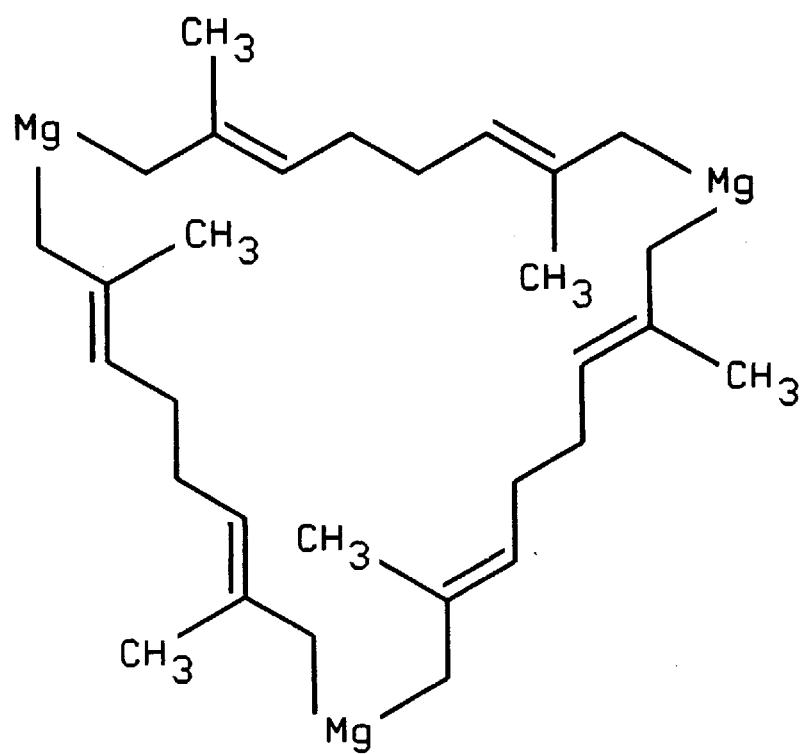
FIG. 2 is a representation of a typical cyclic organomagnesium initiator that may be employed in an embodiment of the anionic polymerization process of the invention to produce macrocyclic polymers.

The resulting adducts may contain one or more (typically one to six) magnesium atoms and from one to about 25 reactant units per magnesium atom in the ring structure. The rings contain a total of from 3 to about 50 ring atoms, including both the metal and reactant unit ring atoms. Some known ring structures containing, on average, 25 members have been reported to contain five magnesium atoms; rings containing 27 members, three magnesium atoms; and larger ring structures, one magnesium atom. A typical initiator suitable for use in the process of the invention is a magnesium-isoprene adduct, illustrated in FIG. 2, containing six isoprene units (a total of 24 ring carbon atoms) and three magnesium atoms in the ring, which results in a total of 27 ring atoms. However, larger or smaller cyclic organometallic compounds, containing more or fewer divalent metal atoms are also suitable as initiators in the process of the invention.

According to the process of the invention, a macrocyclic polymer is prepared by reacting at least one unsaturated anionically polymerizable monomer with the cyclic organometallic initiator, preferably in the presence of an anhydrous, aprotic solvent. As described further below, activation of a metal atom in the initiator ring results in anionic polymerization of the monomers by addition (or insertion) of a monomer molecule into the initiator ring at the bonds between the metal atom and its two adjacent carbon atoms. Thus, the metal atom acts as a bridge between the two living "ends" of the growing cyclic polymer ring and, as monomers are continually incorporated into the ring, the terminal carbons of the two living ends of the growing polymer remain in close proximity to each other. As is known in the art, the amount of initiator used in the polymerization is chosen so as to yield the desired polymer molecular weight. Typically, one part by equivalent of initiator is used to about 20 to 20,000 parts by equivalent of monomer, although high ratios, such as 1:30,000, 1:40,000, 1:50,000 or more can be used.

When polymerization is complete, a coupling/functionalizing agent, is added to the mixture to terminate the reaction and couple together the living ends of the propagating cyclic polymer chain at the carbon-metal moieties, thus producing macrocyclic polymers that are stable in air and moisture and which may also contain functional groups to improve compounding properties. The macrocyclic polymers do not exhibit uncoupled chain ends. However, it is recognized that the polymerization process may produce a mixture of polymers including linear polymers having chain ends that may be either functionalized or not functionalized. It was discovered that, when compounded, the mixture of macrocyclic and linear polymers produced by the method of the invention result in products exhibiting improved hysteresis properties.

Figure 3:
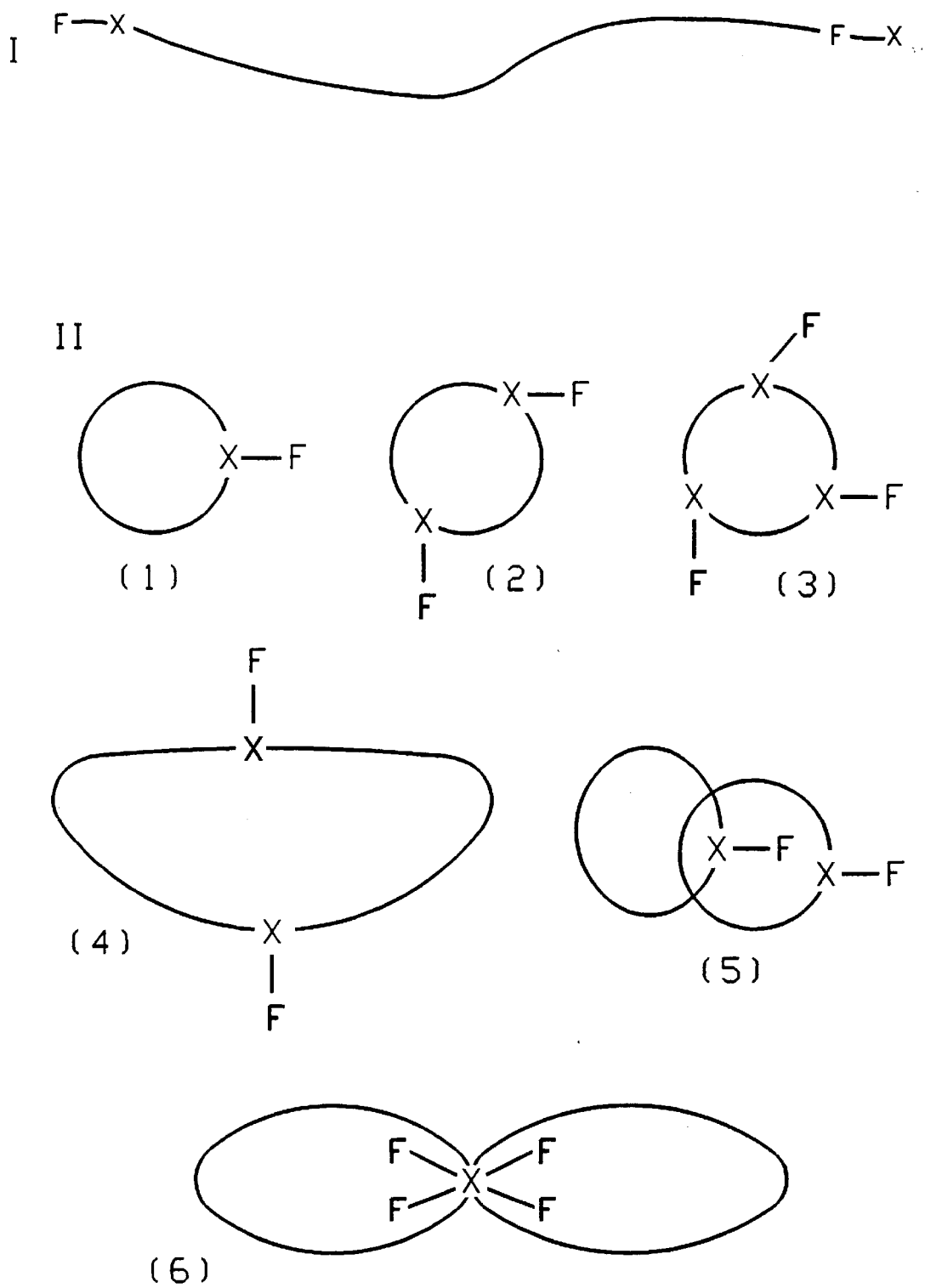
FIG. 3 is a schematic representation of the mixture of linear and macrocyclic polymers that may be obtained when prepared by the process of the invention when polymerization is terminated with a coupling/functionalizing agent "X" which adds a functional group "F" to the polymer ring and endcaps linear polymers in the mixture.

As illustrated in FIG. 3, the polymers produced by the process of the invention are believed to be a mixture of linear polymers (I) and macrocyclic polymers (II) of varying sizes. The resulting ratio of macrocyclic polymers to linear polymers is also variable and dependent on several factors, such as the concentration of monomers, the nature of the activator (see below) and the general reaction conditions, such as temperature and efficiency of the coupling reaction. The size and properties of the macrocyclic polymers formed by the process of the invention also vary according to the nature and concentration of the monomers, the ratio of the monomer to the initiator, the polymerization time, as well as the nature and reactivity of the terminating agent, which may be a coupling agent (X) or a coupling/functionalizing (X-F) agent, as described above. Thus, single ring polymers (1) of varying sizes may be produced by intramolecular coupling of the living ends. In addition, the presence of more than one divalent metal atom in the ring and, therefore, the presence of more than one site for propagation of the polymer chain, may result in single ring sizes that are, for example, double-sized (2) or triple-sized (3). In addition, the coupling agent may couple together living ends of more than one ring, resulting in intermolecular (4) coupling. Moreover, by a similar process, intertwining polymer chains (5), or catenanes, may be formed. Functionalizing coupling agents add a functional group (F) to the ring and also endcap linear polymers present in the mixture, as described above. A tetrafunctional coupling agent may produce a figure eight double ring (6).

In order for anionic polymerization of non-polar monomers to occur, the reaction preferably further requires the presence of an activator which forms a complex with and activates the metal atom on the ring. The activator may comprise a Group IA metal organic compound which, preferably, is one that does not promote linear polymerization. For example, a lithium alkoxide compound which does not promote linear polymerization is preferred over an alkyllithium compound known to promote linear polymerization. Preferably, the activator comprises a Group I metal $C_1$–$C_{12}$ alkoxide or $C_1$–$C_{12}$ alkyl thiolate, such as lithium-t-butoxide or sodium amylthiolate. Other alkali metal organic compounds, such as lithium amides, and potassium, sodium and lithium phosphides, may also be employed as activators. The reaction between organometallic compounds of Group I and Group IIA of the Periodic System are disclosed in U.S. Pat. No. 3,822,219, the disclosure of which is hereby incorporated by reference. Polar solvents or polar coordinators, known to one skilled in the art, may also be employed to promote activation of the initiator Group IIA and IIB metal atom. For example, suitable polar solvents and/or polar coordinators are described in U.S. Pat. Nos. 4,429,091 and 5,272,207, the subject matter of which regarding polar solvents and polar coordinators is incorporated herein by reference.

The Group IIA and IIB cyclic organometallic initiators may be employed with any anionically-polymerizable monomer to yield polymeric products. In the method of the invention, the initiators are used to polymerize unsaturated hydrocarbon monomers, such as ethylene; conjugated alkadienes having from about 4 to about 40 carbon atoms, preferably $C_4$–$C_{12}$ alkadienes, including butadiene, isoprene, and the like; aryl alkenes having from about 8 to about 20 carbon atoms, such as styrene and $C_1$–$C_7$ alkyl or alkoxy substituted styrenes; vinyl polynuclear aromatics, such as vinyl anthracene and vinyl naphthalene and their $C_1$–$C_7$ alkyl and alkoxy substituted analogs; $C_6$–$C_{18}$ trienes; and mixtures of these. Thus, the elastomeric products include include diene homopolymers from monomer A and copolymers thereof with monovinyl aromatic monomers B. Exemplary diene homopolymers are those prepared from diolefin monomers having from about 4 to about 12 carbon atoms. Exemplary vinyl aromatic copolymers are those prepared from monomers having from about 8 to about 20 carbon atoms. Preferred elastomers include diene homopolymers, such as polybutadiene and polyisoprene and copolymers, such as styrene butadiene rubber (SBR). Copolymers can comprise from about 99 to 10 percent by weight of diene units and from about 1 to about 90 percent by weight of monovinyl aromatic or triene units, totalling 100 percent. The polymers and copolymers of the present invention may have 1,2-microstructure contents ranging from about 8 to about 100 percent, with the preferred polymers or copolymers having 1,2-microstructure contents of from about 10 to 70 percent, based upon the diene content.

Polymerization is usually conducted in a conventional solvent for anionic polymerizations, such as hexane, cyclohexane, benzene and the like. Various techniques for polymerization, such as batch, semi-batch and continuous polymerization may be employed. In order to promote monomer randomization in copolymerization and to increase vinyl content, a polar coordinator may optionally be added to the polymerization ingredients. Amounts of the polar coordinator range between about 0.1 to about 90 or more equivalents per equivalent of metal atom. The amount depends upon the type of polar coordinator that is employed, the amount of vinyl content or randomization desired, the level of co-monomer employed and the temperature of the polymerization reaction, as well as the selected initiator.

Compounds useful as polar coordinators are organic and include, but are not limited to, tetrahydrofuran, linear and cyclic oligomeric oxolanyl alkanes such as 2-2'-di (tetrahydrofuryl) propane, di-piperidyl ethane, dimethyl ether, diazabicyclooctane, hexamethylphosphoramide, N-N'-dimethylpiperazine, diethyl ether, tributylamine and the like. The linear and cyclic oligomeric oxolanyl alkane polar coordinators are described in U.S. Pat. No. 4,429,091. Other polar solvents and coordinators are described in U.S. Pat. No. 5,272,207. Other compounds useful as polar coordinators include those having an oxygen or nitrogen heteroatom and a non-bonded pair of electrons. Examples include dialkyl ethers of mono and oligo alkylene glycols; "crown" ethers; and tertiary diamines, such as tetramethylethylene diamine (TMEDA).

According to the process of the invention, polymerization is begun by charging a blend of the monomer(s) and solvent to a suitable reaction vessel, followed by the addition of a Group IA metal organic compound or other activating agent and the cyclic organometallic initiator. As with the preparation of the initiator, the polymerization reaction is carried out under anhydrous, anaerobic conditions. Often, it is conducted under a dry, inert gas atmosphere. The polymerization can be carried out at any convenient temperature, such as about –30° C. to about 200° C. For batch polymerizations, it is preferred to maintain the peak temperature at from about 49° C. to about 149° C., and more preferably from about 80° C. to about 120° C. Polymerization is allowed to continue under agitation for about 0.15 to 24 hours.

After polymerization is complete, the product is terminated by a coupling agent or a coupling agent that is also a functionalizing agent to obtain a macrocyclic polymer. As discussed above, termination of the polymerization reaction with a coupling agent serves to couple the living ends of the polymer chains together to form intramolecular or intermolecular polymer rings that are stable in air and moisture. Thus, the resulting macrocyclic polymers do not exhibit uncoupled chain ends which are known to increase hysteresis. Usually the macrocyclic polymers of this invention have molecular weights ranging from 2,000 to 1,000,000 or even 1.5–3.0×10$^6$. Typically they have molecular weights of 30,000 to 600,000 as measured by conventional gel permeation chromatographic (GPC) techniques.

Quenching with functionalizing agents couples together the macrocycle chain ends and also provides functional groups. After quenching, the polymers still retain the functional group on the polymer ring. The use of a functionalizing agent also serves to endcap any linear polymers present in the polymer mixture with a functional group. Any compounds providing terminal functionality (e.g., "endcapping") of the linear polymers and that are reactive with the macrocyclic polymer bound carbon-metal moieties can be selected to provide a desired functional group. Functionalizing agents are particularly preferred in the process of the invention because the functional group promotes uniform and homogeneous compounding with fillers, such as silica and carbon black.

To obtain linear polymers for comparison of properties with the macrocyclic polymers of the invention, the polymerization reaction may be terminated with a protic quenching agent, such as water, steam or an alcohol, such as isopropanol, that does not couple the living ends of the macrocyclic polymer but produces a linear, non-functionalized polymer.

The terminating agent is added to the reaction vessel, and the vessel is agitated for about 0.1 to about 4.0 hours. Quenching is usually conducted by stirring the polymer and quenching agent for about 0.25 hours to about 1.0 hour at temperatures of from about 30° C. to about 120° C. to ensure a complete reaction.

Lastly, the solvent is removed from the polymer by conventional techniques. These include steam or alcohol coagulation, thermal desolventization, or any other suitable method. Additionally, solvent may be removed by drum drying, extruder drying, vacuum drying or the like. Desolventization by drum-drying, coagulation in alcohol, steam or hot water desolventization, extruder drying, vacuum drying, spray drying, and combinations thereof are preferred. An antioxidant, such as butylated hydroxy toluene (BHT) and/or an antiozonant compound is usually added to the polymer or polymer cement at or before this stage to prevent degradation of the polymer.

Exemplary coupling agents are ortho-dichloro-xylene (ODX), di($C_1$–$C_8$ alkyl) silicon dichloride, silicon tetrachloride, di($C_1$–$C_8$ alkyl) benzoate, esters, diesters, triesters, dihalo organics, hexachloroxylene, and mixtures of these.

Exemplary functionalizing agents are substituted aldimines, substituted ketimines, 4,4'-bis(dimethylamino)

benzophenone, 1,3-dimethyl-2-imidazolidinone, 1-alkyl substituted pyrrolidinones, 1-aryl substituted pyrrolidinones, dimethylamino benzaldehyde, tin tetrachloride, di($C_1$–$C_8$ alkyl) tin dichloride, tri($C_1$–$C_8$ alkyl) tin chloride, carbon dioxide, and mixtures of these. Further examples of reactive compounds include the terminators described in U.S. Pat. No. 5,066,729 and U.S. Pat. No. 5,521,309, the subject matter of which, pertaining to terminating agents and terminating reactions, is hereby incorporated by reference. The practice of the present invention is not limited solely to these terminators, since other compounds that are reactive with the polymer bound carbon-metal moieties can be selected to provide a desired functional group.

Typical polymerization termination reactions utilizing a coupling/functionalizing reagent are illustrated below. Termination with ODX (1) results in a macrocyclic polymer containing a benzene ring. Termination with dimethylamino benzaldehyde (DMAB) (2) results in a macrocyclic polymer having at least two dimethylaminobenzyl functional groups. In the case of DMAB termination, the metal atom (in this embodiment, magnesium) remains as a ring constituent.

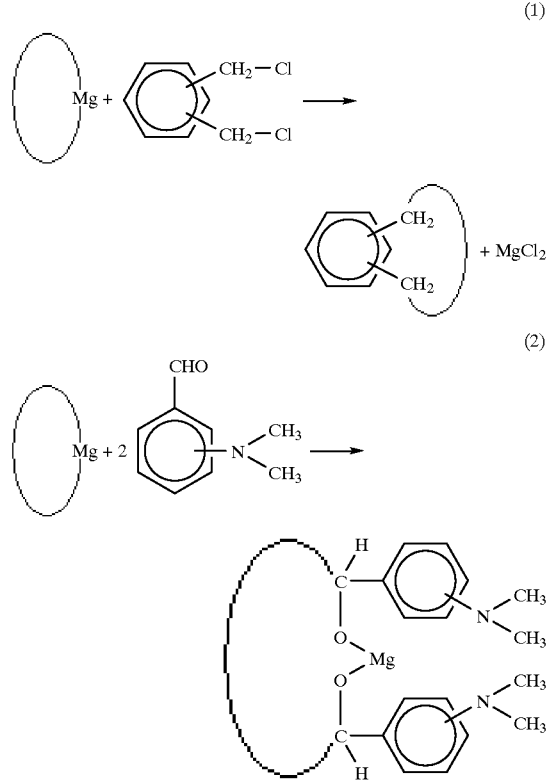

While terminating to provide a functional group on the macrocyclic polymers and terminal end of the linear polymers of the invention is preferred, it is further preferred to terminate by a coupling reaction with a functionalizing agent such as tin tetrachloride or other tin-containing agent. High levels of tin coupling are desirable in order to maintain good processability in the subsequent manufacturing of rubber products. Further, it is known that when polymers are compounded as, for example, in the formulation shown in TABLE I, compound viscosities are increased significantly.

TABLE I

Compounding Test Formulation

| COMPONENT | PARTS BY WEIGHT |
|---|---|
| Polymer | 100 |
| Carbon Black (N-351) | 55 |
| Naphthenic Oil | 10 |
| Zinc Oxide | 3 |
| Antioxidant | 1 |
| Wax | 2 |
| Stearic Acid | 2 |
| Sulfur | 1.5 |
| Accelerator | 1 |

It is preferred that the polymers according to the present invention have at least about 40 percent tin coupling.

As stated above, it has been found that commercially significant quantities of macrocyclic polymers can be produced by the process of the present invention. In comparison with linear polymers, the macrocyclic polymers produced according to the invention exhibit desirable properties, such as lower viscosities at equivalent molecular weights. Thus, high or low molecular weight macrocyclic polymers may be used during polymer compounding processes and manageable compound viscosities are still obtained.

Preferably, the polymers of the present invention contain a functional group attached to the macrocyclic polymer ring and at each end of any linear polymer formed by the process of the invention. These functional groups have an affinity for compounding filler materials such as silica or carbon black. Such compounding results in products, such as tires, shock absorbers, mounts, power belts and the like exhibiting reduced hysteresis, which means a product having increased rebound, decreased rolling resistance and lessened heat build-up when subjected to mechanical stress. Decreased rolling resistance is, of course, a useful property for pneumatic tires, both radial as well as bias ply types and thus, the vulcanizable elastomeric compositions of the present invention can be utilized to form treadstocks for such tires.

The polymers of the invention can be used alone or in combination with other elastomers to prepare an elastomer product such as a tire treadstock, sidewall stock or other tire component stock compound. In a tire of the invention, at least one such component is produced from a vulcanizable elastomer or rubber composition. For example, the polymers according to the invention can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers of the present invention are blended with conventional rubbers, the amounts can very widely such as between about 0–80 percent by weight of the conventional rubber with from about 100-20 percent by weight of the invention polymer.

The polymers can be compounded with all forms of carbon black in amounts ranging from about 5 to 80 parts by weight, per 100 parts of rubber (phr), with about 35 to 60 phr being preferred. The carbon blacks may include any of the commonly available, commercially-produced carbon blacks. Examples of preferred carbon black compounds are described in U.S. Pat. No. 5,521,309, the subject matter of which, relating to carbon black compounds, is incorporated by reference herein. Silica can be used in place of all or part of the carbon black. Preferably, the silica is used in conjunction with a coupling agent, such as silane, by known methods.

The reinforced rubber compounds can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials", pp. 390–402. Vulcanizing agents can be used alone or in combination.

Vulcanizable elastomeric compositions of the invention can be prepared by compounding or mixing the functionalized polymers herein with carbon black and other conventional rubber additives including, for example, fillers, such as silica, plasticizers, antioxidants, curing agents and the like, using standard rubber mixing equipment and procedures. Such elastomeric compositions, when vulcanized using conventional rubber vulcanization conditions, have reduced hysteresis properties and are particularly adapted for use as tread rubbers for tires having reduced rolling resistance.

EXAMPLES AND GENERAL EXPERIMENTAL PROCEDURE

In order to demonstrate the preparation and properties of vulcanizable elastomers and functionalized macrocyclic polymers prepared according to the present invention, a cyclic organomagnesium initiator was prepared. This initiator was than used to polymerize a solution of butadiene monomers or butadiene and styrene monomers. A comparison was made of properties of the resulting polymer or elastomer, when the polymerization was terminated with a protic terminating agent, a coupling agent, or a functionalizing agent.

The described initiator and coupling/functionalizing agents are intended to be only examples of initiators and coupling/functionalizing agents that may be used in the process of the invention, and their particular use is not intended to be limiting, as any cyclic organometallic initiator and coupling/functionalizing agents may be utilized by those skilled in the art.

CYCLIC ORGANOMAGNESIUM INITIATOR PREPARATION

An isoprene-magnesium (IMG) initiator was prepared in a 28-ounce beverage bottle. The bottle was dried by baking for at least 24 hours at 115° C. and then capped with a crown, two-hole cap and rubber liner. The bottle was cooled while purging with dry nitrogen.

Isoprene-Magnesium Initiator (IMG)

In order to prepare the IMG initiator, 10 grams of 50-mesh magnesium metal shavings were activated by 2 millimoles (mM) of butyl magnesium chloride in tetrahydrofuran (THF), in the presence of 115 grams of isoprene and a further 231 grams of anhydrous THF. The reaction mixture was heated to 80° C. in a rotating water bath. Oligomerization of the isoprene was allowed to occur for 18 hours at which time all of the magnesium was reacted. The initiator had a greenish color in THF.

The total magnesium concentration was determined by acid titration of the hydrolyzed initiator. The activity of the IMG for polymerization was determined by polymerizing 1,3-butadiene in hexane at three concentrations of added IMG in the presence of lithium-t-butoxide. Linear least squares analysis of molecular weight data and correction for impurities allows calculation of the concentration of active IMG.

POLYMER PREPARATION

The following examples illustrate the process of the invention for the preparation of macrocyclic polymers from a cyclic organomagnesium initiator. However, the examples are not intended to be limiting, as other cyclic organometallic initiators may be employed, as described in U.S. Pat. No. 5,677,399. Other methods for preparing these macrocyclic polymers from cyclic organometallic initiators according to the invention may be determined by those skilled in the art.

Each of the following polymers was prepared in a purged, oxygen-free one gallon stainless steel reactor. The monomers and solvents had been dried to approximately 5 parts per million (ppm) of water.

Example 1

Six polymers, two at each of three different reactant concentrations indicated below, were prepared using the cyclic organomagnesium initiator, IMG, according to the following general method:

To the reactor was charged 3.5 lbs. of 23.7% 1,3-butadiene in technical hexane and diluted with 1.5 lbs. of additional hexane. While stirring, 0.5 mM of n-butyllithium in technical hexane and 6.0 mM of lithium-t-butoxide in cyclohexane were charged to the reactor at 25° C. After 15 minutes, 4.0 mM of IMG (0.46 molar in ThF) and an additional 10 ml of THF were charged to the reactor. The reactor was then heated to 65–70° C. and the reaction allowed to proceed for 2 hours. A sample taken at this time showed 90% conversion of the monomers to polymer.

Twenty percent of the resultant viscous polymer solution was then removed from the reactor and the reaction was terminated by dropping the polymer (uncoupled) into an equal volume of isopropanol containing one gram BHT (80 grams of BHT in 700 ml. hexane). The BHT solution served as an antioxidant.

To the remaining polymer solution in the reactor was charged 4.0 mM of the coupling agent, dimethyl silicon dichloride, and the reaction was allowed to proceed for one hour. The polymer cement (coupled polymer) was then isolated by coagulation in isopropanol containing BHT. Both the coupled polymer and the isopropanol-terminated, uncoupled polymer were then drum dried.

Two further isopropanol-terminated polymers were prepared in the same manner as the uncoupled polymer described above, except that 3.5 mM IMG and 3.0 mM IMG, respectively, were employed.

Two further coupled polymers were prepared in the same manner as the coupled polymer described above, except that one of these polymers was prepared with 3.5 mM IMG and coupled with 3.5 mM dimethyl silicon dichloride; whereas the second polymer was prepared with 3.0 mM IMG and coupled with 3.0 mM of dimethyl silicon dichloride. As is expected for anionic polymerization, the molecular weight of the polybutadiene increased as the amount of IMG decreased.

Example 2

To the reactor was charged 2.8 lbs. of 25.1% 1,3-butadiene in technical hexane, 1.2 lbs. of additional hexane and 0.53 lbs. of 33% styrene in hexane. The cyclic organomagnesium initiator IMG was charged to the reactor in an amount of 4.2 mM with 6.0 mM lithium-t-butoxide and 2 mM THF. Polymerization proceeded for 2.5 hours at 65° C. to 80° C.

A portion of the resulting viscous polymer solution was then removed from the reactor and the reaction was terminated by dropping the polymer (uncoupled) into an equal volume of isopropanol containing one gram BHT (80 grams of BHT in 700 ml. hexane).

To another portion of the viscous polymer solution was charged 2.0 equivalents (equivalent to the magnesium atom), of the functionalizing agent, tributyl tin chloride ($Bu_3SnCl$). The mixture was then placed in a 50° C. constant temperature water bath and agitated for 1.33 hours. The $Bu_3SnCl$-terminated polymer was isolated by coagulation in an equal volume of isopropanol containing 0.5 grams BHT and thereafter was drum-dried.

To another portion of the viscous polymer solution was charged 1.0 equivalents of the coupling agent, dibutyl tin dichloride ($Bu_2SnCl_2$), and the reaction was allowed to proceed for 1.33 hours in a 50° C. water bath. The $Bu_2SnCl_2$-coupled polymer was then isolated by coagulation in an equal volume of isopropanol containing 0.5 grams BHT and thereafter was drum-dried.

Example 3

Polymers were prepared in a similar manner as those of Example 2, except that 3 mM of the chelating modifier, bis-oxolanyl propane was added to the polymerization mixture to increase the vinyl content of the polymer chains. Polymerization was allowed to proceed for 2.5 hours at 65° C. to 95° C. Portions of the resulting viscous polymer solution were terminated with the protic solvent isopropanol, one equivalent of the coupling agent dibutyl tin dichloride, or two equivalents of the functionalizing agent dimethylamino benzaldehyde (DMAB).

POLYMER EVALUATIONS

A comparison was made of the properties of the polybutadiene and styrene-butadiene polymers made with the cyclic organomagnesium initiator and terminated, respectively, with isopropanol or dimethyl silicon dichloride (a non-functionalizing coupling agent) (Example 1); and isopropanol or the functionalizing agents, dibutyl tin dichloride, tributyl tin chloride, and dimethylamino benzaldehyde (Examples 2 and 3).

The refractive index of each polymer of Example 1 was measured as an indication of vinyl content. Each of the polymers of Example 1 was shown to have a vinyl content of approximately 50%. The vinyl and styrene content of each polymer of Examples 2 and 3 were measured by proton nuclear magnetic resonance. The polymers of Example 2 had a vinyl content of 29% and a styrene content of 18.5% and the polymers of Example 3 had a vinyl content of 56–67% and a styrene content of 20–25%.

The average molecular weight ($M_n$) of each polymer of Examples 1, 2 and 3 was determined by gel permeation chromatography. Each of the polymers was then compounded in a standard test formulation shown in Table I and cured for 30 minutes at 160° C. This formulation yields low tan deltas and, therefore, is especially valuable for comparing hysteresis of different polymers, as described below. All of the compound mixes were prepared in a small Brabender mixer. The viscous modulus M" (at 50° C. and 1 Hz) of each of the cured stocks was obtained. Compound Mooney values were also determined for the styrene-butadiene copolymers of Examples 2 and 3.

To determine if the target property of reduced hysteresis was met by the invention polymers and elastomers, a value of tan delta at 50° C. was determined for the polymers of Examples 2 and 3. Tan delta is a measure of the ratio of the loss modulus of the compound to the storage modulus and it has been found that the lower the magnitude of tan delta, the lower is the hysteresis of the compound. The viscous moduli of the polymers of Examples 1, 2 and 3 were also determined. The viscous modulus is indicative of hysteresis properties, a lower viscous modulus indicating fewer uncoupled chain ends and, therefore, reduced hysteresis when compounded.

Figure 4:
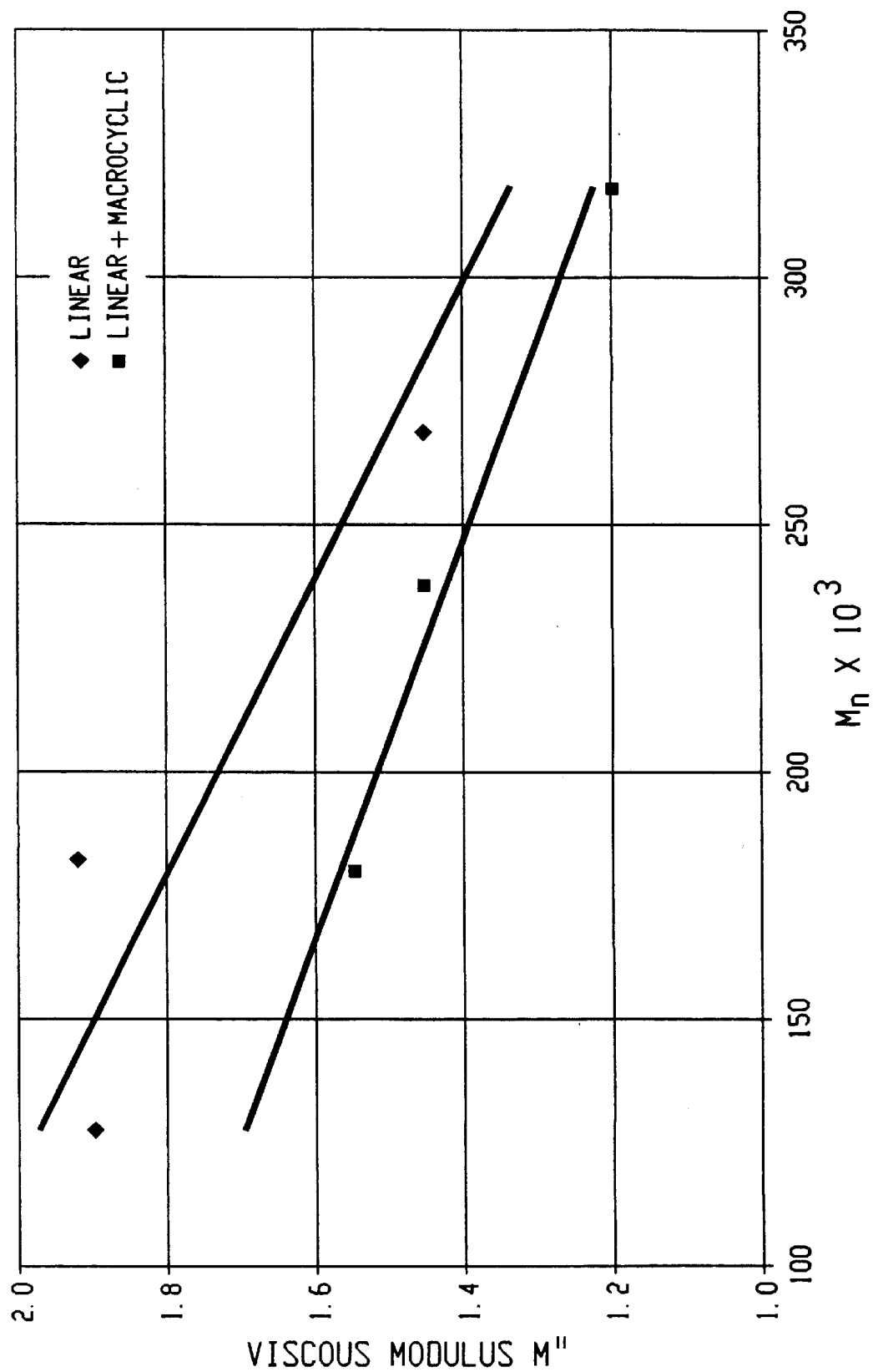
FIG. 4 is a graphic illustration that compares the number average molecular weight ($M_n$) versus the viscous modulus (M") of cured compounds containing coupled, non-functionalized (linear+macrocyclic) and non-coupled, non-functionalized (linear) polybutadiene polymers of Example 1.
Figure 5:
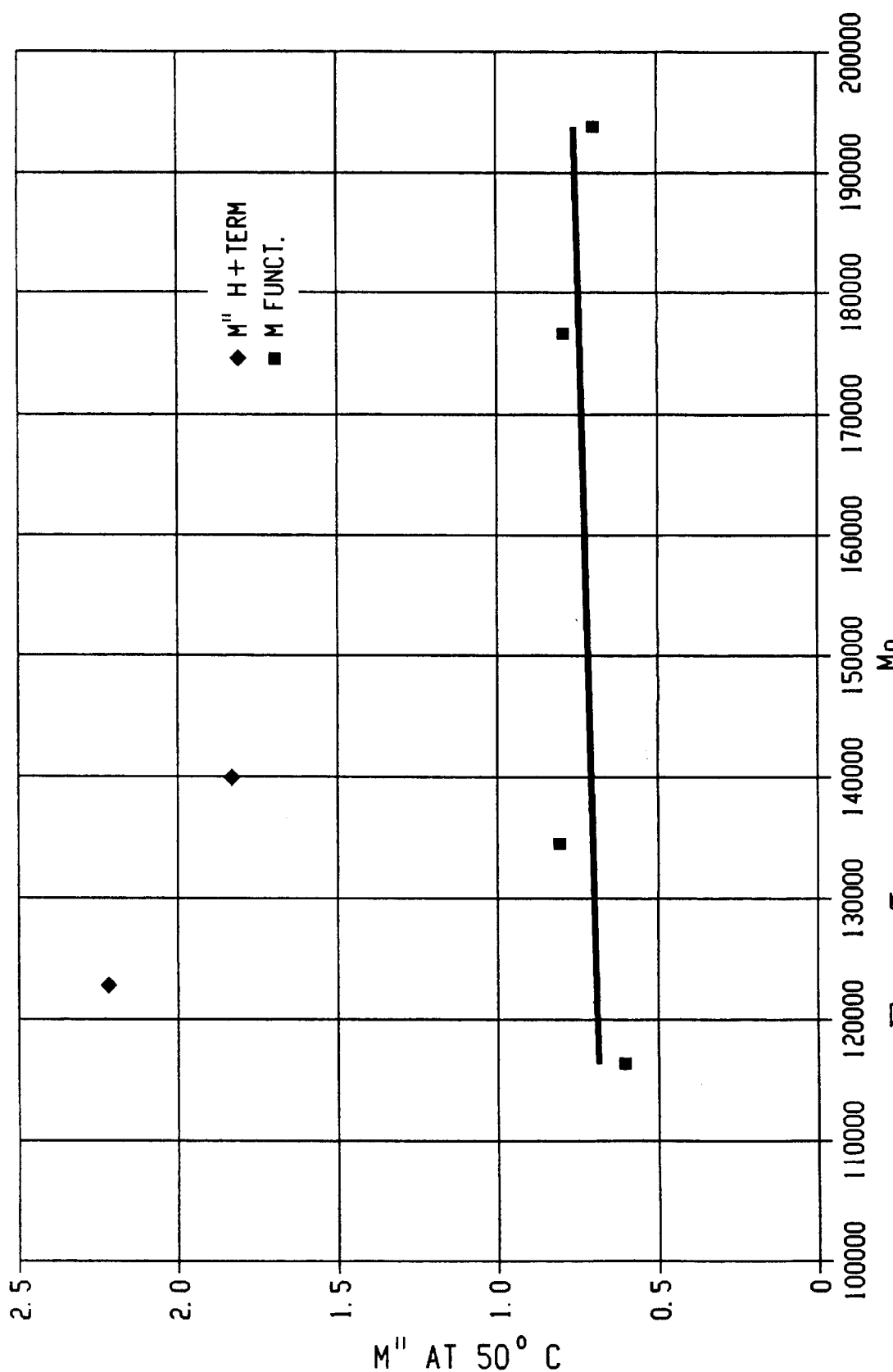
FIG. 5 is a graphic illustration that compares the number average molecular weight ($M_n$) versus the viscous modulus (M") of coupled/functionalized (linear+macrocyclic) and non-coupled, non-functionalized (linear) styrene-butadiene polymers of Examples 2 and 3.

To determine if macrocyclic polymers were formed by the process described above and if the polymers had reduced hysteresis characteristics, a comparison of the average molecular weight ($M_n$) versus the viscous modulus (M") of each of the coupled and non-coupled polymers was made and the results are illustrated in FIGS. 4 and 5. As shown in FIG. 4, the polybutadiene polymers of Example 1 that are coupled but not functionalized (dimethyl silicon dichloride-terminated), have a lower modulus of viscosity than the non-coupled, non-functionalized linear polymers (isopropanol-terminated) at both high and low molecular weights, indicating that the coupled polymers have fewer end groups than the uncoupled polymers. These results are a clear indication that at least a portion of the polymers consists of macrocyclic polymers and that these polymers exhibit a reduced hysteresis property.

The properties of the styrene-butadiene copolymers and elastomers prepared in the Examples 2 and 3 are illustrated in FIG. 5 and in Tables 2 and 3, respectively. Polymers terminated with isopropanol are linear polymers that do not contain functional end groups. Polymers terminated with tributyl tin chloride are linear polymers endcapped with a tributyl tin group. Polymers terminated with the coupling/functionalizing agents dibutyl tin dichloride or dimethylamino benzaldehyde, are a mixture of functionalized macrocyclic and functionalized linear polymers containing functional dibutyl tin or amino groups, respectively.

A comparison of the polymers, illustrated in Tables 2 and 3, shows that the functionalized linear polymers ($BU_3SnCl$-terminated) and the coupled and functionalized macrocyclic and linear polymer mixtures ($Bu_2SnCl_2$-terminated and DMAB-terminated) had significantly lower moduli of viscosity and tan delta values than the linear uncoupled and unfunctionalized polymers (isopropanol-terminated). Further, a comparison of the average molecular weight ($M_n$) versus the viscous modulus (M") of each of the coupled, functionalized and non-coupled polymers, illustrated in FIG. 5, shows that both the functionalized linear and functionalized macrocyclic polymers (M Funct.) of Examples 2 and 3 have a lower modulus of viscosity than the non-coupled, non-functionalized linear polymers (isopropanol-terminated, H+ term) at both high and low molecular weights, indicating that the coupled polymers have fewer end groups than the uncoupled polymers. Further, as illustrated in FIG. 5, the viscous modulus decreases with decreasing molecular weight, as the concentration of free end-groups decreases. These results are a clear indication that at least a portion of the polymers consists of macrocyclic polymers and that these polymers exhibit a reduced hysteresis property.

TABLE 2

| Terminator | isopropanol | Bu₃SnCl | Bu₂SnCl2 |
|---|---|---|---|
| $M_n$ | 139,900 | 134,500 | 176,600 |
| Compound Mooney | 42 | 64 | 93 |
| M" @ 50° C. | 1.832 | 0.8050 | 0.7902 |
| Tan Delta @ 50° C. | 0.208 | 0.141 | 0.132 |

TABLE 3

| Terminator | isopropanol | DMAB | Bu₂SnCl₂ |
|---|---|---|---|
| $M_n$ | 122,800 | 116,300 | 193,800 |
| Compound Mooney | 35 | 24 | 61 |
| M" @ 50° C. | 2.260 | 0.606 | 0.696 |
| Tan Delta @ 50° C. | 0.245 | 0.161 | 0.122 |

It is clear from the foregoing examples and specification disclosure that the macrocyclic polymers prepared with Group IIA and IIB cyclic organometallic initiators, by the method of the invention, exhibit reduced hysteresis properties. As a result, vulcanizable elastomeric compounds containing these polymers exhibit improved hysteresis, which provides lower rolling resistance in tires and improved fuel economy.

The invention is not limited to the specific reactants, Group IIA and IIB cyclic organometallic initiators and Group IA metal organic compounds disclosed, nor to any particular polar coordinator, solvent or other modifier. Similarly, the examples have been provided merely to demonstrate the practice of the subject invention and do not constitute limitations of the invention. Those skilled in the art may readily select other monomers and process conditions, according to the disclosure made herein above. Thus, it is believed that any of the variables disclosed herein can readily be determined and controlled without departing from the scope of the invention herein disclosed and described. Moreover, the scope of the invention shall include all modifications and variations that fall within the scope of the attached claims.

I claim:

1. A vulcanizable elastomeric compound having reduced hysteresis properties, formed by the process of polymerizing at least one unsaturated anionically polymerizable monomer in the presence of an anionic polymerization initiator comprising a cyclic organometallic compound having a divalent metal atom (Mt) and a reactant (Rct) contained in a ring, having the formula

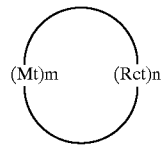

where m and n are each at least one, terminating the polymerization with a coupling agent, and adding from about 5 to about 80 parts by weight of a filler selected from the group consisting of silica, carbon black, and mixtures thereof.

2. The vulcanizable elastomer of claim 1, wherein the metal atom is selected from the group consisting of beryllium, calcium, barium, strontium, magnesium, cadmium, zinc and mercury.

3. The vulcanizable elastomer of claim 1, wherein the reactant, Rct, is selected from the group consisting of $C_2$–$C_{12}$ alkenes, $C_8$–$C_{28}$ alkylenes, $C_4$–$C_{40}$ conjugated alkadienes, polynuclear aromatics, dihaloorganic compounds, and mixtures thereof, and wherein m and n are each independently one to 6 and the total number of ring atoms is 5 to about 50 atoms.

4. The vulcanizable elastomer of claim 1, wherein the initiator comprises a cyclic organomagnesium compound.

5. The vulcanizable elastomer of claim 1, wherein the polymerization is carried out in the presence of an activator selected from the group consisting of a metallic organic compound that comprises a metal selected from the group consisting of lithium, sodium, potassium, rubidium, cesium, and mixtures thereof, a polar solvent; a polar coordinator; and mixtures thereof.

6. The vulcanizable elastomer of claim 1, wherein the anionically polymerizable monomer is selected from the group consisting of ethylene, conjugated alkadiene monomers having from 4 to about 40 carbon atoms, aryl alkene monomers having from about 8 to about 20 carbon atoms, vinyl polynuclear aromatics, $C_6$–$C_{18}$ trienes, and mixtures thereof.

7. The vulcanizable elastomer of claim 1, wherein the metal atom, Mt, is magnesium, the reactant, Rct, is selected from butadiene, isoprene, styrene and mixtures of these, n is 1 to 3, m is 1 to 6 and the monomer is selected from the group consisting of ethylene, $C_4$–$C_{12}$ conjugated alkadienes, $C_8$–$C_{20}$ aryl alkenes, and mixtures thereof.

8. The vulcanizable elastomer of claim 1, wherein the polymerization is carried out in the presence of a solvent that is anhydrous and aprotic.

9. The vulcanizable elastomer of claim 1, wherein the polymerization is carried out in the presence of a monomer randomizing agent.

10. The vulcanizable elastomer of claim 1, wherein the monomer comprises a diene and the polymerization is carried out in the presence of an agent selected from a monomer randomizing agent and a vinyl modifier for increasing the vinyl content of the elastomer, and mixtures thereof.

11. The vulcanizable elastomer of claim 1, wherein the coupling agent is selected from the group consisting of substituted aldimines, substituted ketimines, 4,4'-bis(dimethylamino)benzophenone, 1,3-dimethyl-2-imidazolidinone, 1-alkyl substituted pyrrolidinones, 1-aryl substituted pyrrolidinones, tin tetrachloride, di($C_1$–$C_8$ alkyl) tin dichloride, carbon dioxide, ortho-dichloro-xylene, esters, diesters, triesters, dihalo organics, dimethylamino benzaldehyde, di($C_1$–$C_8$ alkyl) silicon dichloride, silicon tetrachloride, $C_1$–$C_8$ alkyl benzoate, hexachloroxylene, and mixtures thereof.

12. The vulcanizable elastomer of claim 1, wherein the coupling agent is also a functionalizing agent.

13. The vulcanizable elastomer of claim 12, wherein the functionalizing agent is selected from substituted aldimines, substituted ketimines, 4,4'-bis(dimethylamino)-benzophenone, 1,3-dimethyl-2-imidazolidinone, 1-alkyl substituted pyrrolidinones, 1-aryl substituted pyrrolidinones, dimethylamino benzaldehyde, tin tetrachloride, di($C_1$–$C_8$ alkyl) tin dichloride, tri($C_1$–$C_8$ alkyl) tin chloride, carbon dioxide, and mixtures of these.

14. A tire comprising at least one compound formed from the vulcanizable elastomeric compound of claim 1.

15. A tire comprising at least one component formed from the vulcanizable elastomer of claim 12.

16. A functionalized macrocyclic polymer formed by the process of polymerizing at least one unsaturated anionically polymerizable monomer in the presence of an anionic polymerization initiator comprising a cyclic organometallic compound having a divalent metal atom (Mt) and a reactant (Rct) contained in a ring, having the formula

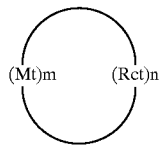

where m and n each represent one or more, and terminating the polymerization with a functionalizing agent, wherein the monomer comprises a diene and polymerization is carried out in the presence of an agent selected from a monomer randomizing agent and a vinyl modifier for increasing the vinyl content of the polymer, and mixtures thereof.

17. A functionalized macrocyclic polymer formed by the process of polymerizing at least one unsaturated anionically polymerizable monomer in the presence of an anionic polymerization initiator comprising a cyclic organometallic compound having a divalent metal atom (Mt) and a reactant (Rct) contained in a ring, having the formula

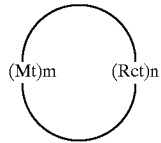

where m and n each represent one or more, and terminating the polymerization with a functionalizing agent selected from the group consisting of substituted aldimines, substituted ketimines, 4,4'-bis(dimethylamino)-benzophenone, 1,3-dimethyl-2-imidazolidinone, 1-alkyl substituted pyrrolidinones, 1-aryl substituted pyrrolidinones, dimethylamino benzaldehyde, tin tetrachloride, di($C_1$–$C_8$ alkyl) tin dichloride, tri($C_1$–$C_8$ alkyl) tin chloride, carbon dioxide, and mixtures of these.

18. A vulcanizable elastomeric compound having reduced hysteresis properties comprising the functionalized macrocyclic polymer of claim 16 and from about 5 to about 80 parts by weight of a filler per 100 parts of the polymer, wherein the filler is selected from the group consisting of silica, carbon black, and mixtures thereof.

19. The vulcanizable elastomeric compound of claim 18, further comprising a mixture of the functionalized macrocyclic polymer and endcapped linear polymers.

20. A tire having at least one component formed from the vulcanizable elastomeric compound of claim 18.

21. A tire having at least one component formed from the vulcanizable elastomeric compound of claim 19.

22. A vulcanizable elastomeric compound having reduced hysteresis properties comprising the functionalized macrocyclic polymer of claim 17 and from about 5 to about 80 parts by weight of a filler per 100 parts of the polymer, wherein the filler is selected from the group consisting of silica, carbon black, and mixtures thereof.

23. The vulcanizable elastomeric compound of claim 22 further comprising a mixture of the functionalized macrocyclic polymer and endcapped linear polymers.

24. A tire having at least one component formed from the vulcanizable elastomeric compound of claim 22.

25. A tire having at least one component formed from the vulcanizable elastomeric compound of claim 23.

* * * * *